United States Patent [19]

Berman

[11] 3,747,795
[45] July 24, 1973

[54] PRESSURE VESSEL
[75] Inventor: Irwin Berman, Upper Montclair, N.J.
[73] Assignee: Foster Wheeler Corporation, Livingston, N.J.
[22] Filed: Dec. 1, 1971
[21] Appl. No.: 203,715

Related U.S. Application Data
[62] Division of Ser. No. 851,386, Aug. 19, 1969, Pat. No. 3,648,876.

[52] U.S. Cl.................. 220/3, 220/39, 220/46, 220/55 F
[51] Int. Cl.................. B65d 41/04, B65d 53/00
[58] Field of Search.............. 220/3, 39, 46, 55 R, 220/55 A, 55 B, 55 C, 55 D, 55 E, 55 F, 55 V

[56] References Cited
UNITED STATES PATENTS
| | | | |
|---|---|---|---|
| 3,170,607 | 2/1965 | Anthon | 220/46 R |
| 3,255,916 | 6/1966 | Rice | 220/39 R |
| 3,338,238 | 8/1967 | Warncke | 220/3 |
| 3,279,645 | 10/1966 | Harvey | 220/55 A |

Primary Examiner—Herbert F. Ross
Assistant Examiner—Allan N. Shoap
Attorney—John Maier, III, John E. Wilson et al.

[57] ABSTRACT

A combined closure and vessel adapted for operation at relatively high pressures is provided with an outer fastening means and an inner means. The location of the means enables the inner means to counteract the bending moment about the outer means.

1 Claim, 2 Drawing Figures

PATENTED JUL 24 1973  3,747,795

PRESSURE VESSEL

CROSS-REFERENCE TO RELATED APPLICATION

The present application is a division of applicant's copending application Ser. No. 851,386, filed on Aug. 19, 1969, now U.S. Pat. No. 3,648,876.

BACKGROUND OF THE INVENTION

For the maintaining of relatively high pressures in the neighborhood of 200,000 psi, and greater, vessels with closures are formed having wall thicknesses that are substantially greater than the internal cross-sectional area of the vessel. It has been a practice to utilize bolted flanges along the outer periphery of the vessel and closure. In view of the substantially large wall thickness of the vessel and closure, a corresponding large moment of force is created about the bolts, and this results in bending of the closure. Another practice has been to utilize a threaded closure along the inner periphery of the vessel. In view of the substantially large wall thickness of the vessel a large moment of force is created about the threaded area. The object of the present invention is to provide a vessel with a closure with additional fastening means in order to counteract the moment of force generated from within the pressurized vessel about the end flanges. This has been achieved by providing additional fastening means which straddle the line of action of the longitudinal force created within the internal chamber of the pressure vessel.

SUMMARY OF THE INVENTION

In accordance with illustrative embodiments demonstrating features and advantages of the present invention there is provided a combined closure and vessel adapted to maintain high operating pressures. The combined closure and vessel comprises a cylindrical vessel wall defining a vessel chamber and a cylindrical closure wall defining a closure chamber, with the closure wall being capable of mating with the vessel wall. There is provided outer fastening means which are exteriorly located with respect to the vessel wall and closure wall to secure the closure to the vessel with the vessel chamber in flow communication with the closure chamber to form a unified, pressurized chamber. Inner fastening means are located between the outer fastening means and the unified chamber such that the inner fastening means counteract the bending moment of force about the outer fastening means which is generated by the pressure in the unified pressurized chamber.

BRIEF DESCRIPTION OF THE DRAWINGS

The above brief description, as well as further objects, features, and advantages of the present invention will be more fully appreciated by reference to the following detailed description of presently preferred but nonetheless illustrative embodiments in accordance with the present invention, when taken in connection with the accompanying drawings wherein.

DESCRIPTION OF THE PREFERRED EMBODIMENTS

Figure 1:
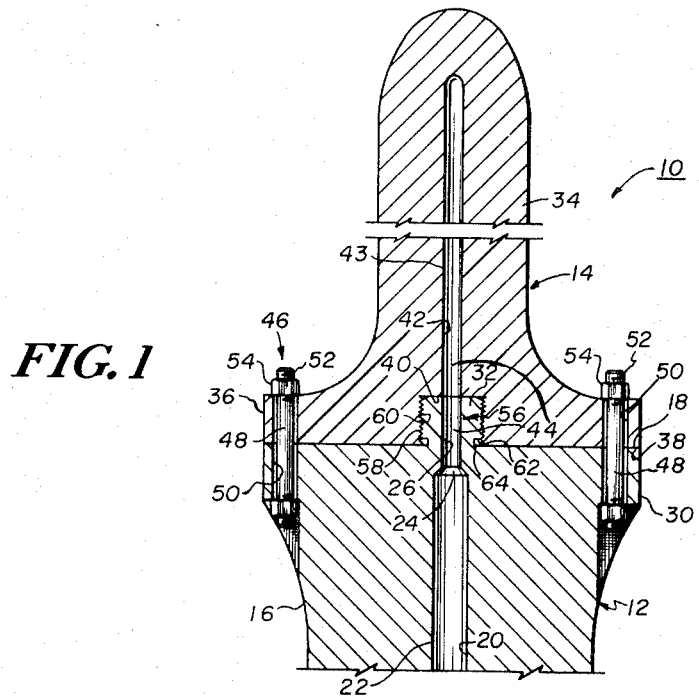
FIG. 1 is a front sectional view of the closure and a portion of a pressure vessel, embodying a first embodiment of the fastening means of the present invention.

Referring to FIG. 1 there is shown a combined closure and vessel capable of maintaining relatively high operating pressures, generally designated by the reference numeral 10, which comprises a shell section 12 that is sealed by a closure section 14.

The shell section 12 is defined by an outer cylindrical wall 16 and a top circular wall 18. For the sake of simplicity, the bottom wall of shell section 14 has not been shown in the drawings. The shell section 12 is formed with an internal chamber 20 which is bounded by an outer cylindrical wall 22, a necked down wall 24, and an inner cylindrical wall 26. Extending outwardly from the wall 16 is an annular shoulder 30, and a cylindrical stud section 32 extends upwardly from circular wall 18 in a position coaxial with respect to the internal shell chamber 20.

The closure section 14 is defined by an outer wall 34 having a generally cylindrical configuration which is closed at one end and integrally formed with a shoulder 36. The bottom of shoulder 36 is bounded by a circular wall 38 which is capable of being brought into mating contact with top circular wall 18, and a central socket 40 extends upwardly from circular wall 38 for receiving the cylindrical stud section 32. The closure section 14 is formed with an internal closure chamber 42 which is bounded by a cylindrical wall 43 that is sized in accordance with the internal diameter of inner cylindrical wall 26. Thus, it is possible to insert the stud section 32 into the central socket 40, as will hereinafter be more fully described, such that the shell chamber 20 is brought into flow communication with the closure chamber 42 to form a unified internal chamber 44.

Outer fastening means 46 are provided to secure the closure section 14 to the shell section 12 which includes stub bolts 48 mounted in through bores 50 which are formed in the shoulder 30 and 36. Each of ths stub bolts 48 are formed with external threads 52 for threadable engagement with a pair of end nuts 54.

An inner fastening means 56 is located between the outer fastening means 46 and the unified internal chamber 44. The inner fastening means 56 include external threads 58 formed along the outer surface of stud section 32 and internal threads 60 formed along the inner surface of central socket 40, such that the stud section 32 can be brought into threadable engagement with the central socket 40 for fastening the closure section 14 onto the shell section 12. It is preferable to form the external threads 58 and internal threads 60 with a helical thread configuration. For the purpose of sealing the closure 14 with respect to the shell section 12, the stud section 32 is formed with an annular recess 62 for receiving a ring gasket 64, which is preferably fabricated from a sufficiently flexible material which can be stretched over the external threads 58 in order to be positioned within the annular recess 62. When the stud section 32 is completely threadably engaged in the central socket 40, and the stub bolts 48 are secured in through bores 50, the inner fastening means 56 will counteract the bending moment of force about the outer fastening means 46 which is generated by the pressure in the unified internal chamber 44.

Figure 2:
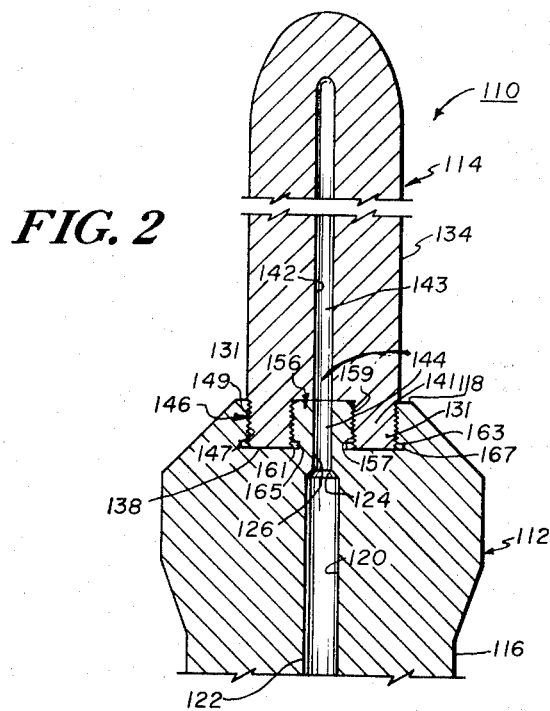
FIG. 2 is a front elevational view of a pressure vessel demonstrating a further embodiment of the fastening means of the present invention.

In FIG. 2 there is illustrated a further embodiment of the invention in which corresponding parts have been designated by the same reference numerals as part of a "100" series. In this form of the invention there is shown a combined closure and pressure vessel generally designated by the reference numeral 110 which comprises a shell section 112 that is sealed by a closure section 114.

The shell section 112 is defined by an outer, substantially cylindrical wall 116 and top circular wall 118. The shell section 112 is formed with an internal chamber 120 which is bounded by an outer cylindrical wall 122, the necked down wall 124, and an inner cylindrical wall 126. Extending downwardly from circular wall 118 is an annular socket section 131 which is in a position that is coaxial with respect to the internal shell chamber 120.

The closure section 114 is defined by an outer wall 134 having a generally cylindrical configuration which is closed at one end and formed with a bottom circular wall 138. An annular stud section 141 extends upwardly from circular wall 138 for being received in the annular socket section 131. The closure section 114 is also formed with an internal closure chamber 142 which is bounded by a cylindrical wall 143 that is sized in accordance with the internal diameter of inner cylindrical wall 126. Accordingly, it is possible to insert the annular stud section 141 into the annular socket section 131 as will hereinafter be more fully described, such that the shell chamber 120 is brought into flow communication with the closure chamber 142 to form a unified internal chamber 144.

Outer fastening means 146 is provided to secure the closure section 114 to the shell section 112 which includes internal threads 147 formed in the annular socket section 131, and external threads 149 formed along the outer periphery of annular stud section 141. An inner fastening means 156 is located between the outer fastening means 146 and the unified internal chamber 144. The inner fastening means 156 includes internal threads 157 formed along the inner periphery of annular socket section 131 and external threads 159 formed along the inner periphery of annular stud section 141. It is preferable to form the internal threads 147, 157 and external threads 149, 159 with a helical thread configuration which is suitably dimensioned for allowing the annular stud section 141 to be threaded into the annular socket section 131. For the purpose of sealing the closure 114 with respect to the shell section 112, the annular socket section 131 is formed with an inner annular recess 161 and an outer annular recess 163 for respectively receiving an inner ring gasket 165 and an outer ring gasket 167. When the annular stud section 141 is completely threadably engaged in the annular socket section 131, the inner fastening means 156 will counteract the bending moment of force of the outer fastening means 146 which is generated by the pressure in the unified internal chamber 144.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A combined closure and vessel adapted to maintain relatively high operating pressures comprising a cylindrical vessel wall defining a vessel chamber, a cylindrical closure wall defining a closure chamber with said closure wall being capable of mating with said vessel wall, outer fastening means exteriorly located with respect to said vessel wall and closure wall to secure said closure to said vessel with said vessel chamber in flow communication with said closure chamber to form a unified pressurized chamber, inner fastening means located between said outer fastening means and said unified chamber such that said inner fastening means counteracts the bending moment of force about said outer fastening means which is generated by the pressure in said unified pressurized chamber, said inner fastenings means including a stud section on said vessel wall formed with external threads and having a central bore extending upwardly from said vessel chamber, an annular closure shoulder integrally formed with said closure wall and an annular vessel shoulder integrally formed with said vessel wall, and said closure wall formed with a cylindrical socket with internal threads for threadable engagement with said stud section.

* * * * *